US012609609B2

(12) United States Patent
Shih et al.

(10) Patent No.: US 12,609,609 B2
(45) Date of Patent: Apr. 21, 2026

(54) POWER SUPPLY DEVICE AND CONTROL CIRCUIT THEREOF

(71) Applicant: FSP TECHNOLOGY INC., Taoyuan City (TW)

(72) Inventors: Yung-Hsiang Shih, Taoyuan City (TW); Ren-Yu Huang, Taoyuan City (TW)

(73) Assignee: FSP TECHNOLOGY INC., Taoyuan City (TW)

( * ) Notice: Subject to any disclaimer, the term of this patent is extended or adjusted under 35 U.S.C. 154(b) by 217 days.

(21) Appl. No.: 18/673,349

(22) Filed: May 24, 2024

(65) Prior Publication Data

US 2025/0211099 A1      Jun. 26, 2025

(30) Foreign Application Priority Data

Dec. 26, 2023    (TW) ................................. 112150868

(51) Int. Cl.
*H02M 1/44*          (2007.01)
*H02M 1/00*          (2006.01)
*H02M 1/42*          (2007.01)
(52) U.S. Cl.
CPC ........... *H02M 1/44* (2013.01); *H02M 1/0067* (2021.05); *H02M 1/4208* (2013.01)

(58) Field of Classification Search
CPC ..... H02M 1/0067; H02M 1/44; H02M 1/4208
See application file for complete search history.

(56) References Cited

U.S. PATENT DOCUMENTS

2019/0123637 A1*    4/2019   Wang ................... H02M 1/4208
2021/0028695 A1*    1/2021   Su ........................... H02M 3/01
2021/0404078 A1*   12/2021   Srinivasan ........ H01M 8/04679

* cited by examiner

*Primary Examiner* — Gary L Laxton
(74) *Attorney, Agent, or Firm* — WPAT, PC

(57)          ABSTRACT

A power supply device includes a rectification circuit, a regulation circuit, a power conversion circuit and a control circuit. The rectification circuit rectifies an input power having a first frequency. The regulation circuit regulates the input power by a switching element. The control circuit includes a controller, a frequency perturbation module and a frequency setting module. The controller controls the switching element according to a control signal. The frequency perturbation module drains the input power to generate a perturbation signal having the first frequency. The frequency setting module generates the control signal based on a basic signal and a perturbation signal having a second frequency. Accordingly, the perturbation signal and the basic signal operating at different frequencies enable the control signal to operate at a varying frequency, further enabling a switching operation of the switching element to operate at the varying frequency.

16 Claims, 3 Drawing Sheets

POWER SUPPLY DEVICE AND CONTROL CIRCUIT THEREOF

BACKGROUND OF THE INVENTION

Field of the Invention

The present invention relates to a power supply device, and more particularly to a power supply device and a control circuit thereof.

Description of the Prior Art

A power supply device usually includes a circuit of at least one semiconductor switching element, for example, a pulse width modulation (PWM) circuit, a pulse frequency modulation (PFM) and power factor correction (PFC) circuit, and a control circuit adjusts turn-on/turn-off timings, switching frequencies and duty cycles, etc., of switching elements in these circuits to improve power conversion efficiency.

However, an existing control circuit controls a switching element by only a fixed switching frequency. When electromagnetic interference (EMI) testing is performed in this case, a quasi-peak (QP) value in an average waveform can easily go beyond a standard limited value, hence failing the EMI testing.

SUMMARY OF THE INVENTION

It is an object of the present invention to reduce electromagnetic interference (EMI).

It is another object of the present invention to decrease the use of other circuit elements that reduce EMI.

It is yet another object of the present invention to reduce copper loss so as to enhance power efficiency.

To achieve the above and other objects, the present invention provides a power supply device including a rectification circuit, a regulation circuit, a power conversion circuit and a control circuit. The rectification circuit is configured to rectify an input power, wherein the input power has a first frequency. The regulation circuit is electrically connected to the rectification circuit, and regulates the input power by at least one switching element. The power conversion circuit is electrically connected to the regulation circuit so as to convert and provide the regulated input power to a load. The control circuit is electrically connected to the power conversion circuit and the regulation circuit, and includes a controller, a frequency perturbation module and a frequency setting module. The controller controls the switching element according to a control signal. The frequency perturbation module is configured to drain the input power to generate a perturbation signal having the first frequency. The frequency setting module is electrically connected to the controller and the frequency perturbation module, and generates the control signal according to a perturbation signal and a basic signal generated by itself, wherein the basic signal has a second frequency. On the basis of the perturbation signal and the basic signal operating at different frequencies, the control signal operates at a varying frequency, and the controller causes, according to the control signal, a switching operation of the switching element to operate at the varying frequency.

According to an embodiment of the present invention, the frequency perturbation module can include an input terminal and a regulator resistor, wherein the input terminal is configured to receive the input power and generate the perturbation signal provided to the frequency setting module based on the regulator resistor.

According to an embodiment of the present invention, the frequency setting module can include a timing resistor and a timing capacitor electrically connected to each other. The timing resistor and the timing capacitor are defined with a first node in between for receiving the perturbation signal, and the timing resistor is further configured to obtain a reference voltage from the controller.

According to an embodiment of the present invention, the regulation circuit can include a power factor correction (PFC) circuit and/or a pulse width modulation (PWM) circuit. Each of the PFC circuit and the PWM circuit includes at least one switching element, and each switching element is controlled by the controller.

According to an embodiment of the present invention, the input power can be a mains power supply having a voltage between 100 V to 240 V, and the regulator resistor is configured with a high voltage resistor having a high resistance value.

According to an embodiment of the present invention, the first frequency is between 50 Hz and 60 Hz.

According to an embodiment of the present invention, the second frequency is 100 kHz.

According to an embodiment of the present invention, the varying frequency is between 110 kHz and 114 kHz.

To achieve the above and other objects, the present invention further provides a control circuit of a power supply device. The power supply device is configured to convert and provide an input power to a load. The control circuit is configured to control a switching element in a regulation circuit of the power supply device and provide an electromagnetic interference (EMI) suppression capability. The control circuit includes the controller, the frequency perturbation module and the frequency setting module described above.

Accordingly, a control signal, generated based on the perturbation signal and the basic signal operating at different frequencies, causes the controller operating at a varying frequency and forms automatic frequency variation. Simultaneously, an operating frequency of the regulation circuit also changes correspondingly (the switching frequency of the switch is variable), effectively dispersing the electromagnetic interference (EMI). This eliminates the need to increase the inductance or the number of coils of a common-mode inductor to solve the issue that a quasi-peak (QP) value easily exceeding a standard limit during EMI testing.

DETAILED DESCRIPTION OF THE EMBODIMENTS

To better understand the objects, features and effects of the present invention, embodiments are given with the accompanying drawings below to further describe details of the present invention.

Singular quantitative expressions, such as "a", "an" and "one", which precede terms used hereinafter, such as units, components, apparatuses, modules, devices, circuits and signals, are not only intended to facilitate explanations but also provide general meanings to the scope of the present disclosure. Therefore, unless otherwise specified obviously, the aforesaid singular quantitative expressions must be interpreted to mean "comprises one or at least one" and include plurals.

Expressions, such as "comprise", "include", "have" and the like, used herein are not limited to essential components of the present disclosure but include any other essential components not definitely disclosed by the present disclosure, yet they are usually intrinsic to the units, components, apparatuses, modules, devices, circuits, signals, or other component usually inherent in the module.

Ordinal numbers, such as "first" and "second," used herein are intended to distinguish or correlate identical or similar units, components, apparatuses, modules, devices, circuits and/or signals and do not necessarily imply what order the units, components, apparatuses, modules, devices, circuits and/or signals are in in terms of space or time. It is understood that in some situations or arrangements the ordinal numbers may be swapped without affecting the effects of implementation of the present disclosure.

Figure 1:
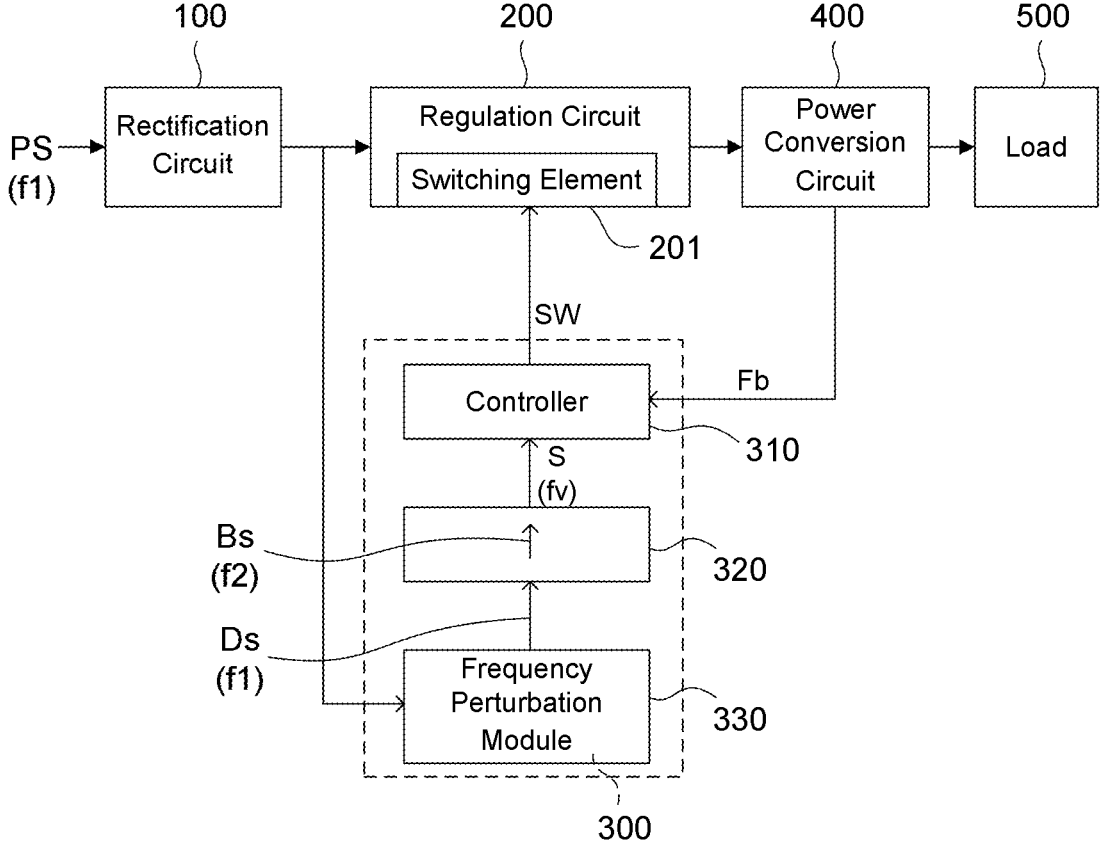
FIG. 1 is a function block diagram of a power supply device according to an embodiment of the present invention.

FIG. 1 shows a function block diagram of a power supply device according to an embodiment of the present invention. The power supply device includes a rectification circuit 100, a regulation circuit 200, a power conversion circuit 400 and a control circuit 300.

The rectification circuit 100 is configured to rectify an input power PS having a first frequency f1, for example but not limited to, converting an alternating current to a direct current by using a full-wave rectification circuit structure. The input power can be a mains power supply with a voltage of within a range between 100 V and 240 V or a power supply having other voltage ranges.

The regulation circuit 200 is electrically connected to the rectification circuit 100 and the power conversion circuit 400. The regulation circuit 200 is configured to regulate and provide the input power rectified by the rectification circuit 100 to the power conversion circuit 400 at the back end. The power conversion circuit 400 is configured to perform power conversion and to provide an input power needed by a load 500 at the back end. The control circuit 300 is electrically connected to the regulation circuit 200 and the power conversion circuit 400. The control circuit 300 correspondingly controls the regulation circuit 200 according to a feedback signal Fb provided by the power conversion circuit 400. The rectification circuit 100, the regulation circuit 200 and the power conversion circuit 400 are common circuit configurations in a general power supply device, and thus associated details are omitted herein.

Each switching element in the regulation circuit 200 is controlled by the control circuit 300. Therefore, a switching frequency of each switching element corresponds to a switching frequency (a fixed frequency, for example, 100 kHz) of an initial setting of the control circuit 300. During an operation of the power supply device, it is possible that higher EMI is easily generated because all of the switching elements are operating at a same frequency, that is, a QP value of EMI testing can easily go beyond a standard limited value. In comparison with other high-frequency elements in the power supply device, the operating frequencies of the switching elements in the regulation circuit 200 are lower. Although a larger number of or more costly filtering elements can be used in the rectification circuit 100, for example, by increasing an inductance of a common-mode inductor, to solve the problem of EMI, this causes an increase in costs. Moreover, a common-mode inductor having a higher inductance has a larger number of inductor coils, such that the overall weight and space occupied by circuits as well as line loss rate (copper loss) are increased, further undesirably affecting the overall efficiency of the power supply device.

A perturbation source is introduced into an embodiment of the present invention to generate a dynamic influence on the operating frequency of the initial setting of the control circuit 300, so as to form a perturbation effect on a switching frequency of a switching element 201 in the regulation circuit 200, hence dispersing the originally concentrated (which is due to the same frequency) EMI to further lower the QP value.

The control circuit 300 includes a controller 310, a frequency setting module 320 and a frequency perturbation module 330. The controller 310 generates, according to a control signal S, a switching signal SW operating at a varying frequency, and is configured to dynamically change the switching frequency of the switching element 201 in the regulation circuit 200. The frequency setting module 320 is electrically connected to the controller 310 and the frequency perturbation module 300. The frequency setting module 320 generates the control signal S according to a perturbation signal Ds from the frequency perturbation module 330 and a basic signal Bs generated by itself; that is, the control signal S is affected by both of the perturbation signal Ds and the basic signal Bs. The perturbation signal Ds has the first frequency f1, and the basic signal Bs has a second frequency f2.

The controller 310 is, like an integrated circuit (IC), controls the switching frequency of the switching element 201 by means of the switching signal SW, and adjusts the frequency of the switching signal SW via a configuration of the frequency setting module 320. First of all, in the prior art without the configuration of the frequency perturbation module 330, the control signal S receives only the influence of the basic signal Bs having the second frequency f2 as generated by the frequency setting module 320, such that the switching signal SW also operates at the second frequency f2. That is to say, in terms of the circuit configuration of the frequency setting module 320, for example, a charging/discharging condition is defined with the coordination of a capacitor and a resistor, wherein the charging/discharging condition enables the control signal S to operate at the second frequency f2. Alternatively speaking, the charging/discharging condition enables the frequency setting module 320 to generate a basic signal Bs, which is used to cause the control signal S to operate at the second frequency f2, that is, a conventional frequency setting module is used to determine an operating frequency of a conventional control signal. In other words, the basic signal is a frequency setting basis of the conventional control signal, and is used to cause a controller to generate a switching signal operating only at a second frequency. In contrast, in the embodiment of the present invention, with the perturbation source introduced, the frequency of the control signal is provided with a varying characteristic.

With the configuration of the frequency perturbation module 330, the perturbation source is introduced to the charging/discharging condition (to be combined with the basic signal), wherein the perturbation source is from the input power PS operating at the first frequency f1. The input power PS itself has its own operating frequency (the first frequency f1), for example but not limited to, a mains power supply has an operating frequency between 50 Hz and 60 Hz. Thus, by using the input power PS operating at the first frequency f1 as the perturbation signal Ds in coordination with the basic signal Bs having the second frequency f2 of the frequency setting module 320. Based on the situation that the perturbation signal Ds and the basic signal Bs operating at different frequencies, the control signal S that the frequency setting module 320 generates for the controller 310 has a characteristic of a varying frequency fv. More specifically, perturbation can be generated by adding another different frequency (the perturbation signal Ds having the first frequency f1) to a fixed frequency (for example, the basic signal Bs having the second frequency f2), so that the control signal S has a characteristic of the varying frequency fv, further enabling the controller 310 to generate the switching signal SW similarly having the characteristic of the varying frequency fv, hence achieving the object of dispersing the originally concentrated EMI (which is due to the same frequency).

Figure 2:
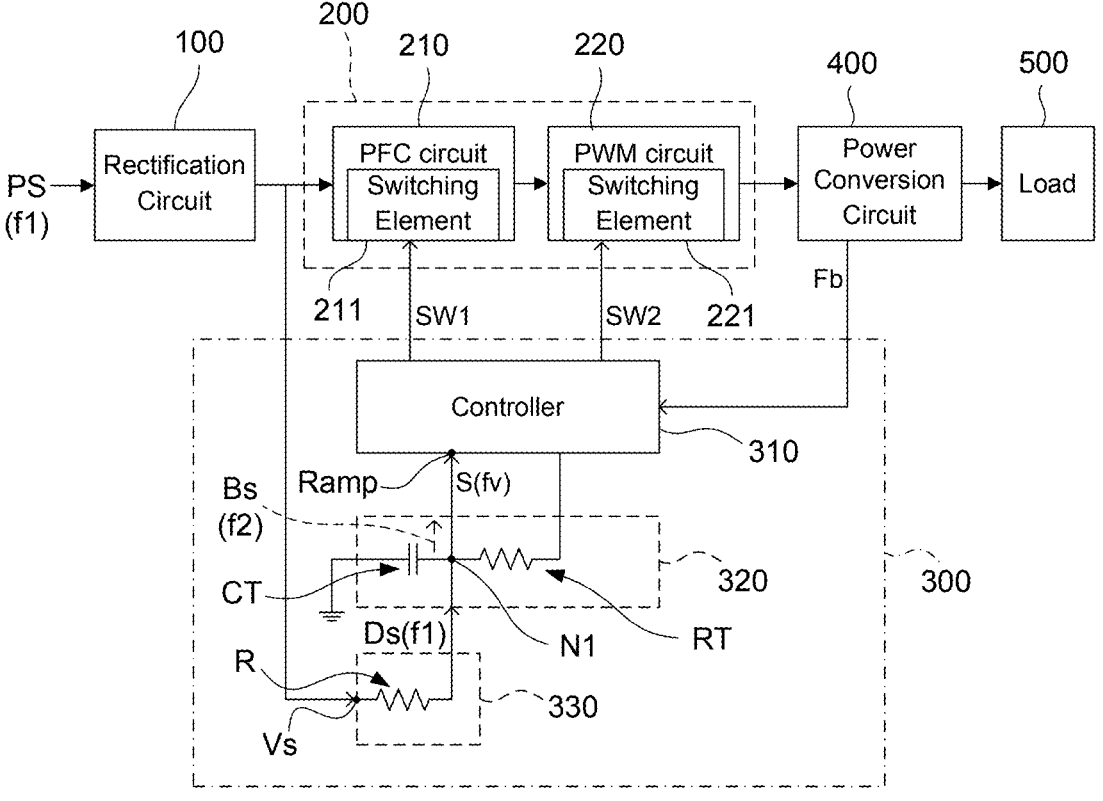
FIG. 2 is a function block diagram of partial detailed circuits of a power supply device according to an embodiment of the present invention.

Next, refer to FIG. 2 showing a function block diagram of partial detailed circuits of a power supply device according to an embodiment of the present invention.

A pin Ramp of the controller 310 is an oscillator timing node and is a common configuration of a general controller. Conventionally, the operating frequency of the switching signal generated by the controller 310 is determined only by the selection of a timing resistor RT and a timing capacitor CT. However, such frequency in the prior art is a fixed frequency, and differs significantly from the embodiments of the present invention.

According to an embodiment of the present invention, a perturbation source is additionally introduced to a node N1 between the timing resistor RT and the timing capacitor CT. The frequency perturbation module 330 includes an input terminal Vs and a regulator resistor R. The input terminal Vs is configured to receive the input power PS having the first frequency f1 from the rectification circuit 100, and, through the regulator resistor R, generates the perturbation signal Ds having the first frequency f1 provided to the frequency setting module 320. On the basis of a combination of the two signals, the basic signal Bs and the perturbation signal Ds having different frequencies, the control signal S having the characteristic of the varying frequency fv can be correspondingly generated. This control signal S enables the controller 310 to generate a first switching signal SW1 and a second switching signal SW2 operating in states of varying frequencies, further controlling switching frequencies of corresponding switching elements 211 and 221 in the regulation circuit 200.

In the embodiment in FIG. 2, the regulation circuit 200 includes a power factor correction (PFC) circuit 210 and a pulse width modulation (PWM) circuit 220. The first switching signal SW1 is used to control each corresponding switching element 211 in the PFC circuit 210, and the second switching signal SW2 is used to control each corresponding switching element 221 in the PWM circuit 220. In other embodiments, the regulation circuit 200 can include only the PFC circuit 210 or only the PWM circuit 220. Moreover, the PFC circuit 210 and the PWM circuit 220 can also be controlled by different controllers, that is, there are two control circuits. In summary, whether the controller 310 generates one switching signal SW or the plurality of switching signals SW1 and SW2, with the perturbation source introduced, the operating frequencies of the switching signals SW, SW1 and SW2 can exhibit a characteristic of varying frequencies, further similarly providing the switching frequency of the corresponding switching elements with a characteristic of varying frequencies.

In other embodiments, the input power PS introduced as the perturbation source can be a mains power supply having a voltage between 100 V and 240 V, and a mains power supply usually has a frequency between 50 Hz and 60 Hz (that is, corresponding to the first frequency f1 above) and can be directly acquired by the rectification circuit 100, hence forming an easily and readily accessible perturbation source while reducing circuit costs. The regulator resistor R can be configured to include a high voltage resistor having a high resistance value (for example, a 1 MΩ resistor having a withstand voltage of 110V, or a 5 MΩ resistor having a withstand voltage of 220 V) to limit a current of the perturbation source, so as to prevent damage to the controller 310.

For example, when the frequency of the perturbation source introduced is between 50 Hz and 60 Hz and the second frequency f2 of the basic signal Bs with the coordination of the timing resistor RT and the timing capacitor CT is 100 kHz, the switching signal (for example, SW, SW1 or SW2) generated by the controller 310 can exhibit an operating state in which the frequency of the signal operates in a dynamically varying range between 110 kHz and 114 kHz.

Figure 3:
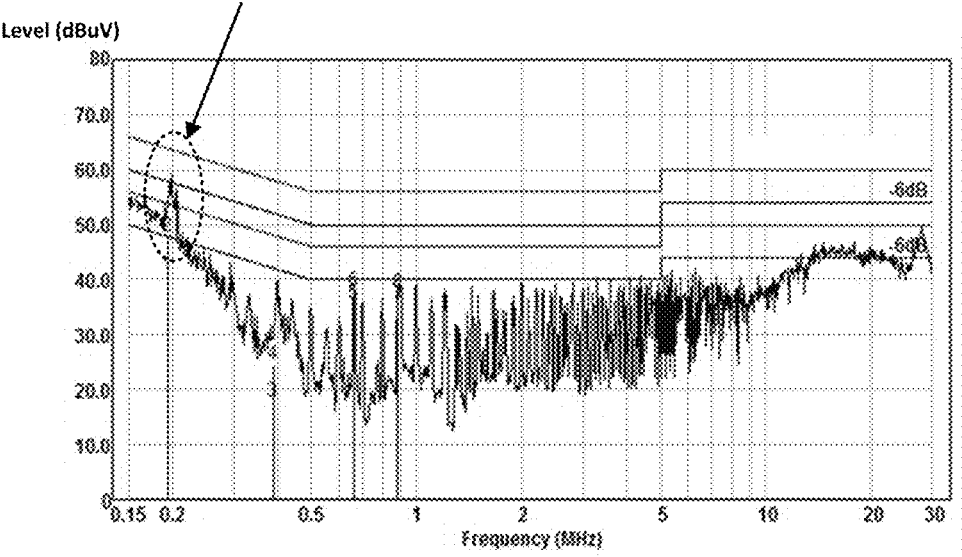
FIG. 3 is an electromagnetic interference (EMI) testing diagram of a power supply device having a conventional control circuit.
Figure 4:
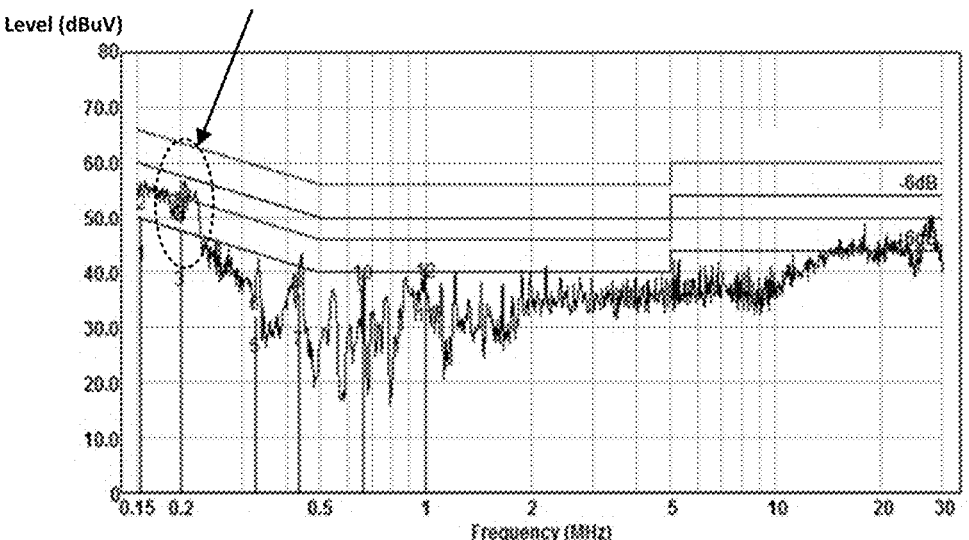
FIG. 4 is an electromagnetic interference (EMI) testing diagram of a power supply device having a control circuit according to an embodiment of the present invention.

Refer to both FIG. 3 and FIG. 4. FIG. 3 shows an electromagnetic interference (EMI) testing diagram of a power supply device having a conventional control circuit. FIG. 4 shows an EMI testing diagram of a power supply device having a control circuit according to an embodiment of the present invention. The input power supplies of the power supply devices are both 115 V. It is known from FIG. 3 that, at the location of the dotted circle, in case of a conventional power supply device without introducing a perturbation source, a higher peak value is generated at a low frequency since all switching elements operate at the same frequency, such that a QP value in an average waveform can easily go beyond a standard limit value. In contrast, it is known from FIG. 4 that, at the location of the dotted circle, in case of a power supply device with an introduced perturbation source, a peak value of an EMI intensity is significantly lowered at an original corresponding position of a low frequency, such that the QP value in an average waveform no longer goes beyond the standard limit value.

In conclusion, the control signal S generated based on the perturbation signal Ds and the basic signal Bs that operate at different frequencies enables the switching signals SW, SW1 and SW2 generated by the controller 310 to operate at the varying frequency fv, further enabling the switching operations of the switching elements 201, 211 and 221 to operate at a varying frequency, thus achieving automatic frequency variation and solving the issue of overly concentrated electromagnetic interference.

The forming of automatic frequency variation also enables the operating frequency of the regulation circuit 200 to change correspondingly (the switching frequency of the switch is variable), hence effectively dispersing the EMI and solving the issue that a QP value can easily exceed a standard limited value during EMI testing, without having to increase an inductance or the number of coils of a common-mode inductor.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure.

All equivalent variations and replacements of the aspects and the embodiments must fall within the scope of the present disclosure. Therefore, the scope of the protection of rights of the present disclosure shall be defined by the appended claims.

What is claimed is:

1. A power supply device, comprising:
a rectification circuit, configured to rectify an input power, the input power having a first frequency;
a regulation circuit, electrically connected to the rectification circuit, the regulation circuit regulating the input power by at least one switching element;
a power conversion circuit, electrically connected to the regulation circuit so as to convert and provide the regulated input power to a load; and
a control circuit, electrically connected to the power conversion circuit and the regulation circuit, the control circuit comprising:
  a controller, controlling the switching element according to a control signal;
  a frequency perturbation module, configured to drain the input power to generate a perturbation signal having the first frequency; and
  a frequency setting module, electrically connected to the controller and the frequency perturbation module, the frequency setting module generating the control signal according to the perturbation signal and a basic signal generated by itself, the basic signal having a second frequency;
  wherein, on the basis of the perturbation signal and the basic signal operating at different frequencies, the control signal operates at a varying frequency, and the controller causes, according to the control signal, a switching operation of the switching element to operate at the varying frequency.

2. The power supply device according to claim 1, wherein the frequency perturbation module comprises an input terminal and a regulator resistor, and the input terminal is configured to receive the input power and generate the perturbation signal provided to the frequency setting module based on the regulator resistor.

3. The power supply device according to claim 2, wherein the frequency setting module comprises a timing resistor and a timing capacitor electrically connected to each other, the timing resistor and the timing capacitor are defined with a first node in between for receiving the perturbation signal, and the timing resistor is further configured to obtain a reference voltage from the controller.

4. The power supply device according to claim 1, wherein the regulation circuit comprises a power factor correction (PFC) circuit and/or a pulse width modulation (PWM) circuit, each of the PFC circuit and the PWM circuit comprises at least one of the switching element, and each switching element is controlled by the controller.

5. The power supply device according to claim 2, wherein the input power is a mains power supply having a voltage between 100 V and 240 V, and the regulator resistor is configured with a high voltage resistor having a high resistance value.

6. The power supply device according to claim 5, wherein the first frequency is between 50 Hz and 60 Hz.

7. The power supply device according to claim 6, wherein the second frequency is 100 kHz.

8. The power supply device according to claim 7, wherein the varying frequency is between 110 kHz and 114 kHz.

9. A control circuit of a power supply device, the power supply device configured to convert and provide an input power to a load, the control circuit configured to control a switching element in a regulation circuit of the power supply device and provide an electromagnetic interference (EMI) suppression capability; the control circuit comprising:
a controller, controlling a switching operation of the corresponding switching element according to a control signal;
a frequency perturbation module, configured to drain the input power to generate a perturbation signal, both the perturbation signal and the input power having a first frequency; and
a frequency setting module, electrically connected to the controller and the frequency perturbation module, the frequency setting module generating the control signal according to the perturbation signal and a basic signal generated by itself, the basic signal having a second frequency;
wherein, on the basis of the perturbation signal and the basic signal operating at different frequencies, the control signal operates at a varying frequency, and the controller causes, according to the control signal, a switching operation of the switching element to operate at the varying frequency.

10. The control circuit according to claim 9, wherein the frequency perturbation module comprises an input terminal and a regulator resistor, and the input terminal is configured to receive the input power and generate the perturbation signal provided to the frequency setting module based on the regulator resistor.

11. The control circuit according to claim 10, wherein the frequency setting module comprises a timing resistor and a timing capacitor electrically connected to each other, the timing resistor and the timing capacitor are defined with a first node in between for receiving the perturbation signal, and the timing resistor is further configured to obtain a reference voltage from the controller.

12. The control circuit according to claim 9, wherein the regulation circuit comprises a power factor correction (PFC) circuit and/or a pulse width modulation (PWM) circuit, each of the PFC circuit and the PWM circuit comprises at least one of the switching element, and each switching element is controlled by the controller.

13. The control circuit according to claim 10, wherein the input power is a mains power supply having a voltage between 100 V and 240 V, and the regulator resistor is configured with a high voltage resistor having a high resistance value.

14. The control circuit according to claim 13, wherein the first frequency is between 50 Hz and 60 Hz.

15. The control circuit according to claim 14, wherein the second frequency is 100 kHz.

16. The control circuit according to claim 15, wherein the varying frequency is between 110 kHz and 114 kHz.

* * * * *